May 26, 1931.   W. E. GOLDSBOROUGH ET AL   1,807,524
FUEL INJECTION SYSTEM
Filed April 2, 1928   3 Sheets-Sheet 1
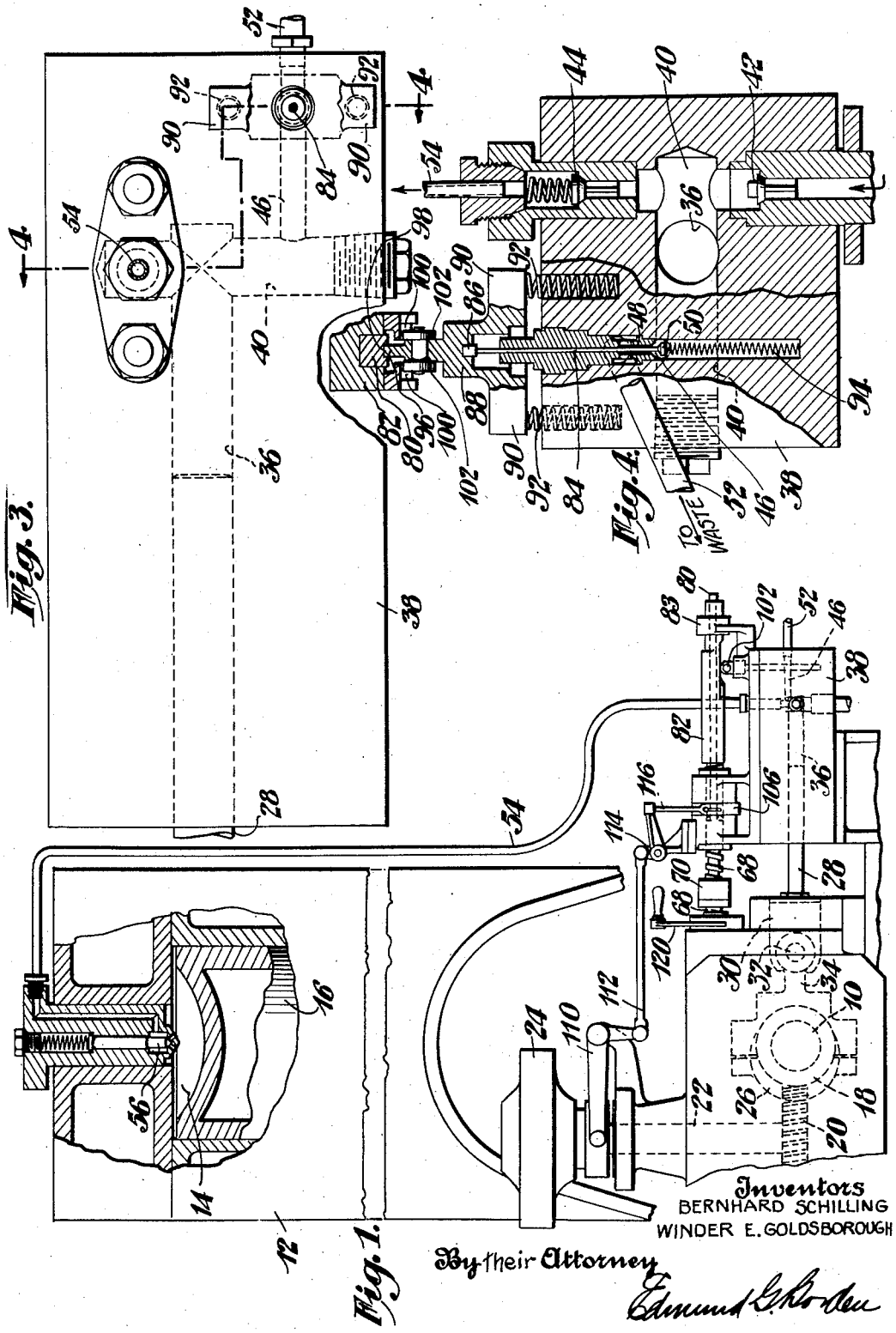
Inventors
BERNHARD SCHILLING
WINDER E. GOLDSBOROUGH
By their Attorney

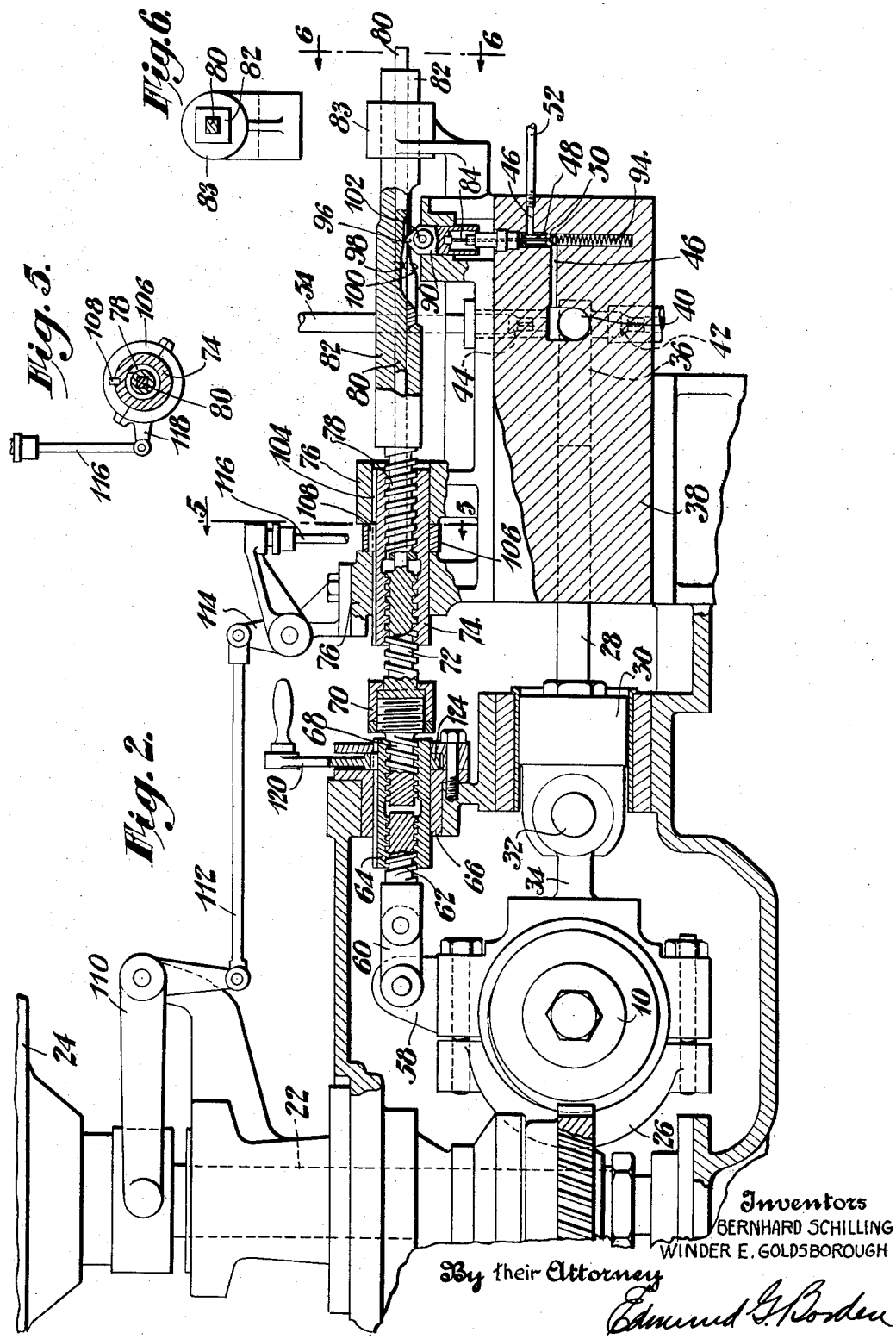

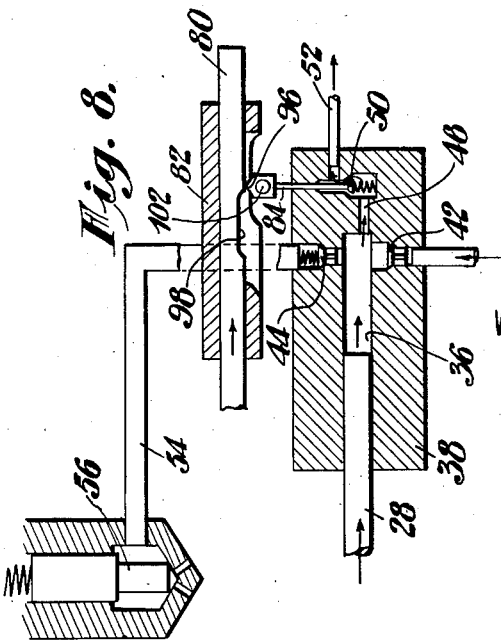
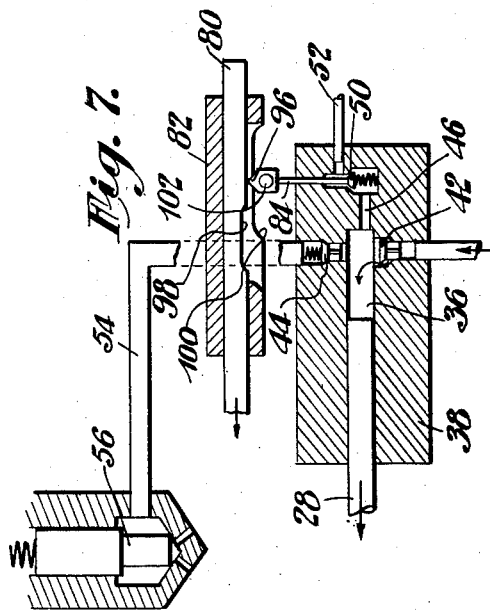
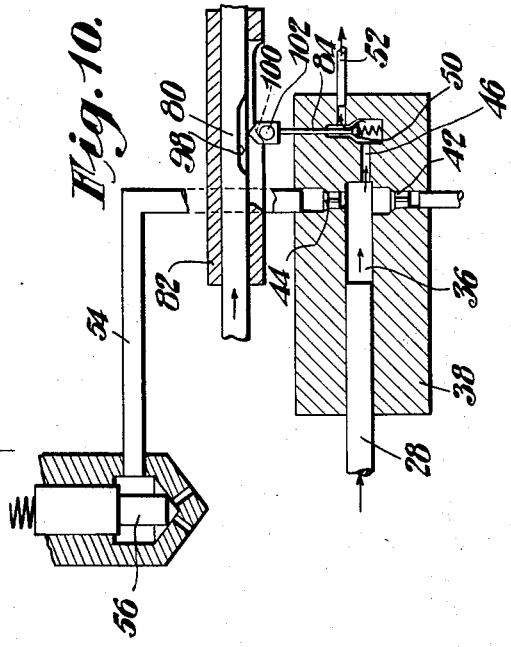
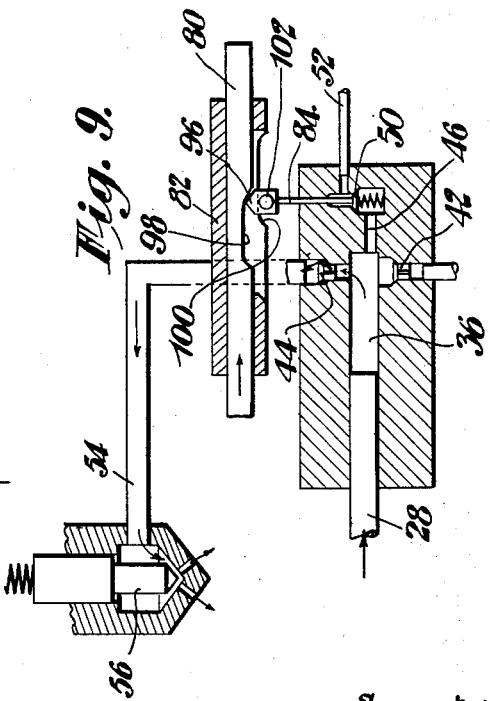
Inventors
BERNHARD SCHILLING
WINDER E. GOLDSBOROUGH
By their Attorney Patented May 26, 1931

1,807,524

UNITED STATES PATENT OFFICE

WINDER E. GOLDSBOROUGH, OF SOUTH NORWALK, CONNECTICUT, AND BERNHARD SCHILLING, OF NEW YORK, N. Y., ASSIGNORS TO DOHERTY RESEARCH COMPANY, OF NEW YORK, N. Y., A CORPORATION OF DELAWARE

FUEL INJECTION SYSTEM

Application filed April 2, 1928. Serial No. 266,781.

The present invention relates to the art of internal combustion engines.

In the operation of internal combustion engines using heavy oil fuel, two methods of injecting the oil into the combustion space have come into common use. One of the said methods supplies highly compressed air to force the fuel into the combustion space with atomization. This system, while efficient, requires a separate high pressure air pump, thus adding to the cost and upkeep of the engine. The second of the two systems referred to is commonly known as the "solid injection method". In this method or system a high hydraulic pressure is relied upon to atomize the fuel at the time it is forced into the combustion space. Difficulties have been encountered however in operating on the solid injectin method in the way of obtaining complete atomization and combustion of the fuel.

One of the objects of the present invention is to provide an arrangement for injecting heavy oil fuel by "solid" injection under conditions bringing about the complete atomization of the fuel.

It has been found further that, when operating on the solid injection method, there has been a tendency for the formation of large drops of fuel at the beginning and end of the fuel injection, thus preventing the rapid combustion of the fuel due to incomplete atomization at these points of the stroke.

A second object of the present invention is to provide means whereby the injection of fuel into the combustion space by the solid injection method is begun and terminated so suddenly that the formation of large drops at the ends of the injection period is minimized.

It is well known to govern internal combustion engines by varying the quantity and timing of the fuel injected into the combustion space.

It is a further object of the present invention to provide a simple and efficient method or arrangement for regulating the timing of the injection with relation to the engine shaft and also for regulating the length of the injection period.

Further objects and advantages of the present invention will be apparent to those skilled in the art from the following description taken in connection with the accompanying drawings, in which:

Fig. 1 is an elevation, partly broken away, of an internal combustion engine having a fuel injecting and regulating system according to the present invention;

Fig. 2 is an elevational view looking in the same direction as Fig. 1 and illustrating on a larger scale the fuel pump and fuel controlling mechanism appearing in Fig. 1, parts of Fig. 2 being broken away and parts being shown in section for purposes of illustration;

Fig. 3 is a plan view on a large scale of the block casting appearing in the lower right hand corner of Fig. 2 and containing the barrel of the fuel pump and the overflow valve, the apparatus in the upper right hand corner of Fig. 2 being removed in Fig. 3;

Fig. 4 is a sectional view on the line 4—4 of Fig. 3, looking in the direction of the arrows, the mechanism on the top of the casting illustrated in Fig. 2 being shown in position in Fig. 4;

Fig. 5 is a section on the line 5—5 of Fig. 2 looking in the direction of the arrows;

Fig. 6 is a detail view in elevation taken from the position of the line 6—6 of Fig. 2 and looking in the direction of the arrows;

Figs. 7 to 10 inclusive are diagrammatic views of the fuel injection system illustrated in Figs. 1 to 4 inclusive, and illustrating the pump plunger, relief valve and operating mechanism for the relief valve in the various relative positions.

Referring to the drawings more in detail, 10 is the shaft of an internal combustion engine, having a cylinder 12 in which is a combustion space 14. Within the cylinder 12 is a piston 16 connected to the shaft 10 by any known or convenient mechanism such as the ordinary crank and pitman connection, not shown. On the shaft 10 is a gear 18 meshing with the gear 20 for driving the vertical shaft 22 of the governor 24. On the shaft 10 is an eccentric having a strap 26 and connected by suitable means to operate the plunger of the fuel pump for supplying heavy oil to the combustion space 14. The plunger of the fuel pump is indicated at 28, plunger 28 being connected to the strap 26 by a sliding head 30 having a pivot connection 32 with a rod 34 fixed to the eccentric strap 26. As the shaft 10 revolves, the eccentric strap 26 is oscillated to reciprocate the plunger 28 in the barrel 36 in the block or casting 38.

The block 38 also contains a cross bore 40, Fig. 4, connecting with the barrel 36 at the end of the barrel removed from shaft 10. Inlet and outlet ports for the barrel 36 are provided connecting with the bore 40 as illustrated in Fig. 4 and controlled respectively by the automatic check valves 42 and 44 in the usual manner. Leading out of the cross bore 40 also is a passage 46 shown best in Fig. 2, and extending forwardly in the same direction as bore 36, but, as clearly appears in Fig. 4, being offset from the vertical plane of the pump barrel 36. The passage 46 connects with a vertical passage 48 controlled by a relief valve 50, the purpose of which will hereinafter more fully appear. Fuel oil which has passed the valve 50 is discharged through the passage 48 and pipe 52 to waste.

When the pump plunger 28 is drawn to the left as viewed in Fig. 2, oil enters the bore 40 and barrel 36 through the inlet valve 42 in the usual manner. As the plunger 28 moves to the right, if it were not for the relief valve 50, the oil would be expelled from the barrel 36 through the outlet valve 44 throughout the whole stroke of the plunger. Oil which has passed the valve 44 is conducted by a pipe 54 to the injection valve 56, Fig. 1, at which point it is sprayed into the combustion space 14. As the pump plunger is moving comparatively slowly at the beginning of its stroke the pressure at the valve 56 would build up slowly and relatively large drops of fuel would be formed in the combustion space if the oil were discharged from the barrel 36 to the pipe 54 during this portion of the stroke. In order to prevent formation of large drops at the beginning of the injection period, the relief valve 50 is held open during the first portion of the forcing stroke of the plunger 28. When the plunger 28 is moving nearly at its maximum speed, the relief valve 50 is closed as quickly as possible, thereby diverting the oil through the outlet valve 44 and building up the pressure at valve 56 with maximum rapidity, so that there is a minimum occasion for the formation of large drops. Flow having been established through the valve 44, it is maintained until the plunger 28 has passed the point of maximum speed in its forcing stroke and has begun to slow down. If the delivery of the oil were maintained to the injection valve 56 until the end of the forcing stroke, the pressure at the valve 56 would fall considerably toward the end of the injection period, owing to the slowing of the plunger 28 toward the end of its stroke.

Therefore, the relief valve 50 is opened again while the pressure at the point 56 is still high enough to prevent the formation of large drops, thereby suddenly cutting off the delivery of the fuel oil through valve 44 to the injection valve 56.

It has been found that in order to substantially prevent the formation of large drops of fuel in the combustion chamber at the beginning and ending of the injection period, the relief valve 50 should be operated at a speed greater than that of the pump plunger at the times the valve is opened and closed. The preferred mechanism for opening and closing the valve 50 at the times and at the speed desired according to the present invention is illustrated in detail in Figs. 2 and 4. For this purpose, the eccentric strap 26 has a lug 58, Fig. 2, thereon connected by a pivoted link 60 to a reciprocating screw member 62. Member 62 has a threaded engagement with the inner surface of a sleeve 64 mounted to reciprocate in a guide 66. Sleeve 64 also has threaded internal engagement with a screw member 68 which reciprocates with the sleeve 64. Screw members 62 and 68 are respectively right and left threaded so that by turning the sleeve 64 they may be moved closer or farther apart as the case may be. The screw member 68 is coupled by a threaded cap 70 to a third screw member 72, which has threaded engagement with the interior of a sleeve 74. The sleeve 74 is mounted to reciprocate on guides 76, 76 and has internal threaded engagement with a fourth screw member 78. The screw members 72 and 78 are respectively left and right threaded so as to be moved closer or farther apart, as the case may be, by the rotation of the sleeve 74. The screw member 78 is hollow and a central rod or internal cam member 80 extends from the righthand end of the screw member 72 through the screw member 78. The screw member 78 forms the left-hand end of an external cam member 82. The cam members 80 and 82 are square in cross section as appears clearly in Fig. 6, and pass through a guide 83 so that they are not turned when the sleeves 64 and 76 are turned.

It will be seen from the foregoing that the cam members 80 and 82 are reciprocated by the eccentric strap 26. Furthermore, it will be evident that the point of connection of the cams 80 and 82 to the lug 58 through the link 60 is at a greater distance from the center of rotation of the shaft 10 than the main portion of the eccentric strap 26 which operates the plunger 28. Therefore the lug 58 moves through a greater distance than the main portion of the eccentric strap during a given revolution and necessarily moves at a greater rate of speed than the plunger 28. The cams 80 and 82 therefore move at a greater rate of speed than the plunger 28 and these cams are used for closing and opening the relief valve 50, thereby operating the relief valve at a greater speed than the pump plunger and minimizing the formation of large drops of fuel in the combustion chamber.

In order to operate the relief valve 50 from the cam members 80 and 82, the valve 50 is provided with a spindle 84 which extends upwardly beyond the top surface of the casting 38 in the vertical plane of the cam members 80 and 82. Cam member 80 operates within cam member 82, but they have the same longitudinal axis which lies in the vertical plane of the axis of spindle 84. The upper end of the spindle 84 is formed into a head 86, Fig. 4, adapted to contact with a seat in a block 88, block 88 having lateral arms 90, 90, resting upon springs 92, 92, set in sockets of the top face of the casting 38. Except for the action of cams 80 and 82, springs 92 support the block 88 at a distance above the casting 38 such that the valve 50 would be normally held closed by spring 94. The upper end of the block 88, however, is formed into a contact point 96 which extends up into contact with the under surface of cam member 80, the outer member 82 being cut away for a certain distance on its under side to permit contact between point 96 and member 80. When the parts are in the position illustrated in Fig. 2, valve 50 is held open. As cam members 80 and 82 move toward the right from the position illustrated in Fig. 2, a grooved out portion 98 on the inner member 80 comes above the point 96, permitting the spring 94 to throw the relief valve 50 suddenly upward to cut off escape of the fluid through the relief valve. The reopening of relief valve 50 is controlled by the outer cam member 82. Member 82 has cam surfaces 100, one of which is illustrated in Fig. 2, and which lie on the outside of the point 96. The block 88 carries below the point 96 a pair of contact rollers 102, 102. As the member 82 moves toward the right from the position illustrated in Fig. 2, the cam surfaces 100 contact with the rollers 102 to force the block 88 quickly downward to suddenly open valve 50. Of course during the return stroke of the members 80 and 82 from right to left as viewed in Fig. 2, the relief valve 50 will be operated again to first close and then open so that it will be open at the beginning of the stroke of the plunger and cam members from left to right as illustrated in Fig. 2. In Fig. 2, it will be understood that the plunger has begun its stroke from left to right and that the relief valve 50 is just about to be closed. However, the operation of the relief valve 50 on the suction stroke of the plunger 28, that is to say, on the stroke from right to left as in Fig. 2, is immaterial, since the overflow pipe 52 can be connected to a source of fuel oil so that it acts merely as an auxiliary supply to the barrel 36 when relief valve 50 is open.

The relation of the parts as above described during the operation of the plunger 28 is clearly illustrated in Figs. 7 to 10 inclusive. In Fig. 7, the plunger 28 is nearing the end of its suction stroke, the relief valve 50 being open and the contact point 96 being held down by the cam 80. In Fig. 8, the plunger 28 is moving to the right and is just beginning its forcing stroke, the inlet and outlet valves 42 and 44 both being closed and the oil escaping from the barrel 36 through the relief valve 50. In both Figures 7 and 8, the injection valve 56 is closed. When the parts have reached the position illustrated in Fig. 9, cam 80 has moved to the right sufficiently to bring the groove 98 above the contact point 96, thereupon permitting closure of valve 50 and the sudden delivery of the fuel oil through outlet valve 44, and through the injection valve 56 into the combustion space. In Fig. 10, the outer cam member 82 has moved to the right enough to bring the cam surfaces 100 into contact with the rollers 102, thereby forcing down the head 88 and reopening the valve 50. The opening of valve 50 has relieved the pressure on the injection valve 56 so that it is shown closed in Fig. 10.

It is evident that the amount of fuel injected into the combustion space depends upon how large a portion of the revolution of shaft 10 the contact point 96 lies in the groove 98 of the inner cam member 80. The length of time which the contact point 96 may remain in the groove 96 depends upon the relative position of the inner cam member 80 and the outer cam member 82. It will be obvious from Fig. 2 that, if the inner cam member is shifted to the right relatively to the outer cam member, the contact point 96 will remain in the groove 98 a longer time and that the relief valve 50 will therefore remain closed a greater portion of each revolution of the shaft 10. The amount of fuel per stroke delivered to the combustion chamber will evidently be increased thereby. By shifting the outer cam member 82 to the right relatively to the inner cam member 80, the period of time during a given revolution of shaft 10 which the contact point 96 may remain in groove 98 is shortened and the amount of fuel injected per stroke into the combustion space is thereby decreased. Relative movements of the cam members 80 and 82, as just mentioned, are produced when desired, according to the present invention by rotating the interiorly threaded sleeve 74. For this purpose, the sleeve 74 is provided with an external groove 104 extending parallel to the axis of the sleeve. Surrounding the sleeve 74 is a rotatable collar 106 held against movement axially of sleeve 74 by contact of the two members 76 in which the sleeve is mounted. A key 108 fitted into a groove in the collar 106 and into the groove 104 in the sleeve 74 connects the collar 106 and the sleeve 74 so that the two are forced to rotate together, but the sleeve 74 is free to move axially. By rotating sleeve 74, the threaded memeber 78 is shifted either toward or away from mmeber 72 thereby moving the outer cam member 82 to the right or to the left with respect to the inner cam member 80. The rotation of the collar 106 and the sleeve 74 to shift the relative positions of cams 80 and 82 is controlled by the governor 24. For this purpose, the collar of the governor is connected to a bell crank 110 which is connected by link 112 to a second bell crank 114 connected in turn by a rod 116 to an arm 118 (Fig. 5) on the collar 106. As the governor changes its position in response to changes in speed of shaft 10, it rotates the collar 106 by the connections just mentioned to turn the collar in one direction or the other so as to turn the sleeve 74 to move the screws 72 and 78 either closer together or farther apart thereby to shift the cam members 80 and 82 with relation to each other to maintain the rate of the fuel injection at that required by the speed of the engine. Turning the sleeve 74, however, does not vary the initial instant of the period of injection with respect to the rotation of shaft 10.

In order to vary the timing of the relief valve 50 with respect to the shaft 10, or in other words to vary the point in the revolution of the shaft 10 corresponding to the mean instant of the injection of the fuel when injecting a given quantity, the sleeve 64 is rotated. The sleeve 64 is preferably operated manually, and for this purpose a crank 120 is fixed to a collar 124 keyed to the sleeve 64 and by turning the crank 120 in one direction or the other, the sleeve 64 is rotated in one direction or the other, in the manner similar to that described in connection with the collar 106 and the sleeve 74. Collar 64 having threaded engagement with screw members 62 and 68, the rotation of the sleeve 64 moves the members 62 and 68 either closer together or farther apart. The left end of the screw member 62 being fixed, the relative movement between the members 62 and 68 moves the latter member either to the right or to the left. Movement of the member 68 necessarily moves both inner cam 80 and outer cam member 82 the same amount, since inner member 80 is directly connected to the screw member 68 and the outer cam member 82 is connected to the screw member 62 and 78 through the sleeve 74 and screw 78. Rotation of crank 120 therefore varies the points in the stroke at which the fuel injection begins and ends, but without varying the length of time of the fuel injection or the amount of fuel injected per stroke. It will be noted that rotation of crank 120 involves the longitudinal movement of both screw 72 and sleeve 74. For this purpose, the collars 124 and 106 are splined to the sleeves 64 and 74, respectively.

It will be seen from the foregoing that the present invention provides, not only for the injection of heavy fuel with a minimum tendency toward the production of large drops in the combustion space, but that it also provides a very simple and compact arrangement for varying the amount and timing of the fuel injection.

While we have described and illustrated a specific embodiment of the present invention, it will be understood that the present invention is not limited to the present disclosure, but that it is defined and limited solely by the appended claims.

We claim:

1. The combination in an internal combustion engine of a fuel pump having a pressure chamber and a forcing member therein, a relief valve permitting the escape of fluid from said chamber during a portion of the forcing stroke, and a cam arranged to open said valve and having a speed at the time of opening of the valve greater than that of said forcing member.

2. The combination as set forth in claim 1 together with a second cam actuated from the engine and controlling the closing of the relief valve.

3. The combination in an internal combustion engine of a fuel pump having a pressure chamber and a forcing member therein, a relief valve permitting the escape of fluid from said chamber during a portion of the forcing stroke, and a reciprocating cam arranged to open said valve and having a speed at the time of opening the valve greater than that of said forcing member.

4. The combination as set forth in claim 3, together with a second reciprocating cam for closing the relief valve.

5. The combination in an internal combustion engine of a fuel pump having a pressure chamber and a forcing member therein, a relief valve permitting the escape of fluid from said chamber during a portion of the forcing stroke of said member, and a pair of reciprocating cams controlling the opening and closing of said relief valve, one of said cams being mounted to slide within the other.

6. The combination in an internal combustion engine of a fuel pump having a pressure chamber and a forcing member therein, a relief valve permitting the escape of fluid from said chamber during a portion of the forcing stroke of said member, a pair of reciprocating cams for controlling the times of opening and closing of said relief valve, and a single eccentric connected to operate said cams.

7. The combination as set forth in claim 6, together with means whereby the relative position of said cams may be varied with respect to one another.

8. The combination in an internal combustion engine of a fuel pump having a pressure chamber and a forcing member therein, a relief valve permitting the escape of fluid from said chamber during a portion of the forcing stroke, a pair of reciprocating cams arranged one within the other and arranged to control the times of opening and closing of said relief valve, and operating means giving to said cams, at the times of opening and closing the relief valve, speeds greater than that of said forcing member.

9. The combination in an internal combustion engine of a fuel pump having a pressure chamber and a forcing member therein, a relief valve permitting the escape of fluid from said chamber during a portion of the forcing stroke, a pair of cams mounted one within the other and arranged to control the times of opening and closing said relief valve, and governor controlled means for varying the relative position of said cams with respect to one another.

10. The combination in an internal combustion engine of a fuel pump having a pressure chamber and a forcing member therein, a relief valve permitting the escape of fluid from said chamber during a portion of the forcing stroke, a pair of reciprocating cams arranged one within the other and mounted to control the times of opening and closing of said relief valve, governor controlled means for varying the position of said cams with respect to one another to vary the amount of fuel delivered per stroke by said pump, a single operating eccentric for said cams, and operator controlled means whereby said cams may be simultaneously adjusted with respect to said eccentric.

11. The combination in an internal combustion engine of a fuel pump having a pressure chamber and a forcing member therein, a relief valve permitting the escape of fluid from said chamber during a portion of the forcing stroke, a pair of reciprocating cams mounted one within the other and arranged to control the times of opening and closing said valve, governor controlled means for adjusting the position of said cams with respect to one another to vary the amount of fuel delivered per stroke by said pump, and a single eccentric connected to operate both said forcing member and said cams.

12. The combination in an internal combustion engine of a pair of reciprocating cams mounted one within the other, a sleeve threadedly mounted on the inner one of said cam members and having a threaded connection with the outer of said cam members, a collar splined to the outer surface of said sleeve, and means for rotating said collar to vary the relative positions of said cams with respect to one another.

13. In an internal combustion engine, the combination of an eccentric, a reciprocating member connected to said eccentric, a sleeve threaded on said reciprocating member, a reciprocating cam member having internal threaded engagement with said sleeve, a collar splined to the outer surface of said sleeve, means whereby said collar may be rotated to vary the relation of said cam member to said eccentric, a second sleeve threaded to said cam member, a second cam member surrounding said first cam member and having interior threaded engagement with said second sleeve, a second collar splined to the outer surface of said second sleeve and governor controlled means for rotating said second collar to vary the relative position of said cams with respect to one another.

14. The combination in an internal combustion engine of a fuel pump having a pressure chamber and a forcing member therein, a relief valve permitting the escape of fluid from said chamber during a portion of the forcing stroke, and a cam arranged to close said valve and having a speed at the time of closing of the valve greater than that of said forcing member.

15. The combination in an internal combustion engine of a fuel pump having a pressure chamber and a forcing member therein, a relief valve permitting the escape of fluid from said chamber during a portion of the forcing stroke, and a reciprocating cam arranged to close said valve and having a speed at the time of closing the valve greater than that of said forcing member.

16. The combinaion in an internal combustion engine of a fuel pump having a pressure chamber and a forcing chamber therein, a relief valve permitting the escape of fluid from said chamber during a portion of the forcing stroke, reciprocating cams arranged to control the times of opening and closing said valve, and a single eccentric connected to operate both said forcing member and said cams, said cams being connected to said eccentric at a point so removed laterally from the center of rotation of the eccentric that the speeds of said cams at the times of opening and closing said valve are greater than that of said forcing member at said times.

17. In a fuel pump for internal combustion engines having a pressure chamber, a forcing member therein, and a positively actuated relief valve for controlling the quantity of fuel supplied by said pump and the timing thereof, means for varying the point in the pump stroke at which said valve is opened, separate means for varying the point in the pump stroke at which the valve is closed, and means for simultaneously varying both of said means.

In testimony whereof, we affix our signatures.

WINDER E. GOLDSBOROUGH
BERNHARD SCHILLING.